United States Patent
Fisher et al.

(10) Patent No.: US 11,398,634 B2
(45) Date of Patent: Jul. 26, 2022

(54) SOLID OXIDE FUEL CELL SYSTEM AND METHOD OF OPERATING THE SAME USING PEAK SHAVING GAS

(71) Applicant: BLOOM ENERGY CORPORATION, Sunnyvale, CA (US)

(72) Inventors: John Fisher, San Jose, CA (US); Jayakumar Krishnadass, Sunnyvale, CA (US); David Weingaertner, Sunnyvale, CA (US); Laxmikant Girwalkar, Mumbai (IN); Shraddesh Malviya, Mumbai (IN)

(73) Assignee: BLOOM ENERGY CORPORATION, San Jose, CA (US)

( * ) Notice: Subject to any disclaimer, the term of this patent is extended or adjusted under 35 U.S.C. 154(b) by 419 days.

(21) Appl. No.: 16/360,271

(22) Filed: Mar. 21, 2019

(65) Prior Publication Data
US 2019/0305335 A1   Oct. 3, 2019

Related U.S. Application Data

(60) Provisional application No. 62/648,632, filed on Mar. 27, 2018.

(51) Int. Cl.
*H01M 8/04082* (2016.01)
*H01M 8/2404* (2016.01)
(Continued)

(52) U.S. Cl.
CPC ..... *H01M 8/04082* (2013.01); *H01M 8/0662* (2013.01); *H01M 8/1253* (2013.01); *H01M 8/2404* (2016.02)

(58) Field of Classification Search
CPC .... C01B 2203/0233; C01B 2203/0261; C01B 2203/066; C01B 2203/16; C01B 3/382; C01B 3/386
See application file for complete search history.

(56) References Cited

U.S. PATENT DOCUMENTS 3,453,087 A   7/1969   Herp, Jr. et al.
3,453,146 A   7/1969   Bawa et al.
(Continued)

FOREIGN PATENT DOCUMENTS

DE   4005468 A1   8/1991
DE   19924777 A1   11/2000
(Continued)

OTHER PUBLICATIONS

Anonymous, Presentation of the LabView-based software used in the Fuel Cell Technologies Testing System. Internet Article, Jul. 15, 2004, http://web.archive.org/web/20040715025135/fuelcelltechnologies.com/Support/Downloads/Tutorial.pdf.
(Continued)

*Primary Examiner* — Adam A Arciero
(74) *Attorney, Agent, or Firm* — The Marbury Law Group PLLC

(57) ABSTRACT

A fuel cell system and method for using a peak shaving gas, the system including: a fuel inlet configured to receive fuel from a fuel source; a catalytic partial oxidation (CPOx) reactor configured to at least partially oxidize the fuel during startup of the system; a blower configured to provide air to the CPOx reactor; a gas analyzer configured to determine a composition of fuel provided to the CPOx reactor from the fuel inlet; an oxidation catalyst configured to reduce an $O_2$ content of fuel received from the CPOx reactor; a reforming catalyst configured to partially reform fuel received from the oxidation catalyst; and a stack of fuel cells configured to generate electricity using fuel received from the reforming catalyst.

14 Claims, 6 Drawing Sheets

(51) Int. Cl.
  *H01M 8/1253*   (2016.01)
  *H01M 8/0662*   (2016.01)

(56) References Cited

U.S. PATENT DOCUMENTS

| | | |
|---|---|---|
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |
| 3,972,731 A | 8/1976 | Bloomfield et al. |
| 3,973,993 A | 8/1976 | Bloomfield et al. |
| 3,976,506 A | 8/1976 | Landau |
| 3,982,962 A | 9/1976 | Bloomfield |
| 3,990,912 A | 11/1976 | Katz |
| 4,001,041 A | 1/1977 | Menard |
| 4,004,947 A | 1/1977 | Bloomfield |
| 4,041,210 A | 8/1977 | Van Dine |
| 4,098,722 A | 7/1978 | Cairns et al. |
| 4,182,795 A | 1/1980 | Baker et al. |
| 4,190,559 A | 2/1980 | Retallick |
| 4,315,893 A | 2/1982 | McCallister |
| 4,365,007 A | 12/1982 | Maru et al. |
| 4,374,184 A | 2/1983 | Somers et al. |
| 4,402,871 A | 9/1983 | Retallick |
| 4,430,304 A | 2/1984 | Spurrier et al. |
| 4,473,517 A | 9/1984 | Goedtke et al. |
| 4,473,622 A | 9/1984 | Chludzinski et al. |
| 4,522,894 A | 6/1985 | Hwang et al. |
| 4,532,192 A | 7/1985 | Baker et al. |
| 4,539,267 A | 9/1985 | Sederquist |
| 4,548,875 A | 10/1985 | Lance et al. |
| 4,554,223 A | 11/1985 | Yokoyama et al. |
| 4,567,117 A | 1/1986 | Patel et al. |
| 4,647,516 A | 3/1987 | Matsumura et al. |
| 4,654,207 A | 3/1987 | Preston |
| 4,657,829 A | 4/1987 | McElroy et al. |
| 4,670,359 A | 6/1987 | Beshty et al. |
| 4,678,723 A | 7/1987 | Wertheim |
| 4,696,871 A | 9/1987 | Pinto |
| 4,702,973 A | 10/1987 | Marianowski |
| 4,716,023 A | 12/1987 | Christner et al. |
| 4,722,873 A | 2/1988 | Matsumura |
| 4,728,584 A | 3/1988 | Isenberg |
| 4,737,161 A | 4/1988 | Szydlowski et al. |
| 4,792,502 A | 12/1988 | Trocciola et al. |
| 4,808,491 A | 2/1989 | Reichner |
| 4,810,472 A | 3/1989 | Andrew et al. |
| 4,812,373 A | 3/1989 | Grimble et al. |
| 4,820,314 A | 4/1989 | Cohen et al. |
| 4,824,740 A | 4/1989 | Abrams et al. |
| 4,828,940 A | 5/1989 | Cohen et al. |
| 4,847,051 A | 7/1989 | Parenti, Jr. |
| 4,865,926 A | 9/1989 | Levy et al. |
| 4,898,792 A | 2/1990 | Singh et al. |
| 4,904,548 A | 2/1990 | Tajima |
| 4,917,971 A | 4/1990 | Farooque |
| 4,933,242 A | 6/1990 | Koga et al. |
| 4,983,471 A | 1/1991 | Reichner et al. |
| 4,994,331 A | 2/1991 | Cohen |
| 5,009,967 A | 4/1991 | Scheffler |
| 5,034,287 A | 7/1991 | Kunz |
| 5,039,579 A | 8/1991 | Kinoshita |
| 5,047,299 A | 9/1991 | Shockling |
| 5,077,148 A | 12/1991 | Schora et al. |
| 5,079,105 A | 1/1992 | Bossel |
| 5,082,751 A | 1/1992 | Reichner |
| 5,082,752 A | 1/1992 | Koga et al. |
| 5,084,362 A | 1/1992 | Farooque |
| 5,084,363 A | 1/1992 | Reiser |
| 5,084,632 A | 1/1992 | Farooque |
| 5,091,075 A | 2/1992 | O'Neill et al. |
| 5,100,743 A | 3/1992 | Narita et al. |
| 5,143,800 A | 9/1992 | George et al. |
| 5,169,730 A | 12/1992 | Reichner et al. |
| 5,170,124 A | 12/1992 | Blair et al. |
| 5,175,062 A | 12/1992 | Farooque et al. |
| 5,187,024 A | 2/1993 | Matsumura |
| 5,212,022 A | 5/1993 | Takahashi et al. |
| 5,227,256 A | 7/1993 | Marianowski et al. |
| 5,232,792 A | 8/1993 | Reznikov |
| 5,246,791 A | 9/1993 | Fisher et al. |
| 5,270,127 A | 12/1993 | Koga et al. |
| 5,302,470 A | 4/1994 | Okada et al. |
| 5,324,452 A | 6/1994 | Allam et al. |
| 5,328,779 A | 7/1994 | Tannenberger et al. |
| 5,340,664 A | 8/1994 | Hartvigsen |
| 5,344,721 A | 9/1994 | Sonai et al. |
| 5,346,779 A | 9/1994 | Nakazawa |
| 5,348,814 A | 9/1994 | Niikura et al. |
| 5,360,679 A | 11/1994 | Buswell et al. |
| 5,366,819 A | 11/1994 | Hartvigsen et al. |
| 5,441,821 A | 8/1995 | Merritt et al. |
| 5,453,146 A | 9/1995 | Kemper |
| 5,470,360 A | 11/1995 | Sederquist |
| 5,498,487 A | 3/1996 | Ruka et al. |
| 5,501,914 A | 3/1996 | Satake et al. |
| 5,505,824 A | 4/1996 | McElroy |
| 5,516,344 A | 5/1996 | Corrigan |
| 5,527,631 A | 6/1996 | Singh et al. |
| 5,573,867 A | 11/1996 | Zafred et al. |
| 5,601,937 A | 2/1997 | Isenberg |
| 5,641,585 A | 6/1997 | Lessing et al. |
| 5,686,196 A | 11/1997 | Singh et al. |
| 5,693,201 A | 12/1997 | Hsu et al. |
| 5,733,675 A | 3/1998 | Dederer et al. |
| 5,741,605 A | 4/1998 | Gillett et al. |
| 5,763,114 A | 6/1998 | Khandkar et al. |
| 5,955,039 A | 9/1999 | Dowdy |
| 6,013,385 A | 1/2000 | DuBose |
| 6,051,125 A | 4/2000 | Pham et al. |
| 6,106,964 A | 8/2000 | Voss et al. |
| 6,106,967 A | 8/2000 | Virkar et al. |
| 6,126,908 A | 10/2000 | Clawson et al. |
| 6,232,005 B1 | 5/2001 | Pettit |
| 6,280,865 B1 | 8/2001 | Eisman et al. |
| 6,309,770 B1 | 10/2001 | Nagayasu et al. |
| 6,329,090 B1 | 12/2001 | McElroy et al. |
| 6,348,278 B1 | 2/2002 | Lapierre et al. |
| 6,376,111 B1 | 4/2002 | Mathias et al. |
| 6,383,670 B1 | 5/2002 | Edlund et al. |
| 6,403,245 B1 | 6/2002 | Hunt |
| 6,436,562 B1 | 8/2002 | DuBose |
| 6,451,466 B1 | 9/2002 | Grasso et al. |
| 6,492,050 B1 | 12/2002 | Sammes |
| 6,531,243 B2 | 3/2003 | Thom |
| 6,582,842 B1 | 6/2003 | King |
| 6,623,880 B1 | 9/2003 | Geisbrecht et al. |
| 6,655,150 B1 | 12/2003 | Asen et al. |
| 6,656,625 B1 | 12/2003 | Thompson et al. |
| 6,749,958 B2 | 6/2004 | Pastula et al. |
| 6,821,663 B2 | 11/2004 | McElroy |
| 6,880,628 B2 | 4/2005 | Yoshida et al. |
| 6,924,053 B2 | 8/2005 | McElroy |
| 7,067,208 B2 | 6/2006 | Gottmann et al. |
| 7,452,619 B2 | 11/2008 | Ahmed |
| 7,659,022 B2 | 2/2010 | Valensa et al. |
| 7,704,617 B2 | 4/2010 | Venkataraman |
| 7,705,490 B2 | 4/2010 | Srinivasan et al. |
| 7,713,649 B2 | 5/2010 | Hickey et al. |
| 7,736,774 B2 | 6/2010 | Ogiwara et al. |
| 7,974,106 B2 | 7/2011 | Gurunathan et al. |
| 8,057,944 B2 | 11/2011 | Venkataraman |
| 8,062,802 B2 | 11/2011 | Devriendt |
| 8,101,307 B2 | 1/2012 | McElroy et al. |
| 8,137,855 B2 | 3/2012 | Weingaertner et al. |
| 8,288,041 B2 | 10/2012 | Perry et al. |
| 8,920,997 B2 | 12/2014 | Venkataraman |
| 8,968,943 B2 | 3/2015 | Perry et al. |
| 9,287,572 B2 | 3/2016 | Weingaertner et al. |
| 2001/0009653 A1 | 7/2001 | Clawson et al. |
| 2001/0049035 A1 | 12/2001 | Haltiner, Jr. et al. |

(56) References Cited

U.S. PATENT DOCUMENTS

| | | |
|---|---|---|
| 2002/0004154 A1 | 1/2002 | Pastula et al. |
| 2002/0015867 A1 | 2/2002 | Cargnelli et al. |
| 2002/0028362 A1 | 3/2002 | Prediger et al. |
| 2002/0058175 A1 | 5/2002 | Ruhl |
| 2002/0106544 A1 | 8/2002 | Noetzel et al. |
| 2002/0142198 A1 | 10/2002 | Towler et al. |
| 2002/0142208 A1 | 10/2002 | Keefer et al. |
| 2002/0192516 A1 | 12/2002 | Tajima |
| 2003/0021741 A1 | 1/2003 | Childress et al. |
| 2003/0031904 A1 | 2/2003 | Haltiner |
| 2003/0049502 A1 | 3/2003 | Dickman et al. |
| 2003/0143448 A1 | 7/2003 | Keefer |
| 2003/0157386 A1 | 8/2003 | Gottmann |
| 2003/0162067 A1 | 8/2003 | McElroy |
| 2003/0196893 A1 | 10/2003 | McElroy |
| 2003/0205641 A1 | 11/2003 | McElroy |
| 2003/0224231 A1* | 12/2003 | Penev ................. H01M 8/0618 429/423 |
| 2003/0235725 A1 | 12/2003 | Haltiner et al. |
| 2004/0018144 A1 | 1/2004 | Briscoe |
| 2004/0023088 A1* | 2/2004 | Ozeki ............... H01M 8/04574 429/416 |
| 2004/0089438 A1 | 5/2004 | Valensa et al. |
| 2004/0096713 A1 | 5/2004 | Ballantine et al. |
| 2004/0131912 A1 | 7/2004 | Keefer et al. |
| 2004/0142215 A1 | 7/2004 | Barbir et al. |
| 2004/0191597 A1 | 9/2004 | McElroy |
| 2004/0191598 A1 | 9/2004 | McElroy |
| 2004/0202914 A1 | 10/2004 | Sridhar et al. |
| 2004/0217732 A1 | 11/2004 | Zhu et al. |
| 2004/0224193 A1 | 11/2004 | Mitlitsky et al. |
| 2004/0258587 A1 | 12/2004 | Bowe et al. |
| 2005/0048334 A1 | 3/2005 | Sridhar et al. |
| 2005/0048336 A1 | 3/2005 | Takebe et al. |
| 2005/0048338 A1 | 3/2005 | Kobayashi et al. |
| 2005/0053814 A1 | 3/2005 | Imamura et al. |
| 2005/0056412 A1 | 3/2005 | Reinke et al. |
| 2005/0106429 A1 | 5/2005 | Keefer |
| 2005/0164051 A1 | 7/2005 | Venkataraman et al. |
| 2005/0204628 A1 | 9/2005 | Deshpande |
| 2005/0249988 A1 | 11/2005 | Pearson |
| 2006/0046112 A1* | 3/2006 | Isozaki ............... H01M 8/0618 429/412 |
| 2006/0083964 A1 | 4/2006 | Edlinger et al. |
| 2006/0147771 A1 | 7/2006 | Russell et al. |
| 2006/0248799 A1 | 11/2006 | Bandhauer et al. |
| 2006/0251934 A1 | 11/2006 | Valensa et al. |
| 2006/0251939 A1 | 11/2006 | Bandhauer et al. |
| 2006/0251940 A1 | 11/2006 | Bandhauer et al. |
| 2007/0017367 A1 | 1/2007 | McElroy et al. |
| 2007/0017368 A1 | 1/2007 | Levan et al. |
| 2007/0017369 A1 | 1/2007 | Levan et al. |
| 2007/0111053 A1 | 5/2007 | Penev et al. |
| 2007/0178338 A1 | 8/2007 | McElroy et al. |
| 2007/0196704 A1 | 8/2007 | Valensa |
| 2007/0231628 A1 | 10/2007 | Lyle et al. |
| 2007/0231635 A1 | 10/2007 | Venkataraman et al. |
| 2007/0243435 A1 | 10/2007 | Dutta |
| 2007/0269693 A1 | 11/2007 | Perry |
| 2008/0038600 A1 | 2/2008 | Valensa et al. |
| 2008/0050632 A1 | 2/2008 | Salter et al. |
| 2008/0057359 A1 | 3/2008 | Venkataraman et al. |
| 2008/0197190 A1 | 8/2008 | Fujita |
| 2009/0029204 A1 | 1/2009 | Venkataraman et al. |
| 2009/0029205 A1 | 1/2009 | Venkataraman et al. |
| 2009/0042068 A1 | 2/2009 | Weingaertner |
| 2009/0208784 A1 | 8/2009 | Perry et al. |
| 2010/0009221 A1 | 1/2010 | Ballantine et al. |
| 2010/0119888 A1* | 5/2010 | Song .................. H01M 4/9016 429/416 |
| 2010/0203416 A1 | 8/2010 | Venkataraman |
| 2010/0239924 A1 | 9/2010 | McElroy et al. |
| 2011/0053027 A1 | 3/2011 | Weingaertner |
| 2011/0281185 A1 | 11/2011 | Sridhar et al. |
| 2012/0178003 A1 | 7/2012 | Venkataraman |
| 2012/0196194 A1 | 8/2012 | Perry et al. |
| 2012/0196195 A1 | 8/2012 | Perry et al. |
| 2012/0202130 A1 | 8/2012 | Weingaertner et al. |
| 2012/0270117 A9 | 10/2012 | Venkataraman et al. |
| 2013/0130138 A1* | 5/2013 | Ukai ..................... C01B 3/48 429/423 |
| 2014/0106247 A1 | 4/2014 | Higdon et al. |

FOREIGN PATENT DOCUMENTS

| | | |
|---|---|---|
| EP | 0 398 111 A1 | 11/1990 |
| EP | 0 977 294 B1 | 2/2000 |
| EP | 1057998 B1 | 11/2003 |
| EP | 1 501 146 A2 | 1/2005 |
| EP | 1513208 | 3/2005 |
| EP | 1571726 A1 | 9/2005 |
| EP | 1258453 B1 | 1/2007 |
| JP | 2004-270803 | 4/1994 |
| JP | 2001-307703 A | 11/2001 |
| JP | 2004-247290 | 9/2004 |
| WO | WO 1994/18712 | 8/1994 |
| WO | WO2000/061707 A1 | 10/2000 |
| WO | WO2003/019707 | 3/2003 |
| WO | WO2004/013258 A1 | 2/2004 |
| WO | WO2004/076017 | 9/2004 |
| WO | WO 2004/092756 | 10/2004 |
| WO | WO2004/093214 | 10/2004 |
| WO | WO2004/095618 | 11/2004 |

OTHER PUBLICATIONS

Hamburger, R. O., et al., "LabView DSC Automates Fuel Cell Catalyst Research," Nov. 4, 2004, http://web.archive.org/web/20041104200039/http://bloomy.com/newsletters/fuelcellresearch.pdf.

Austin, "Cell and Stack Construction: Low-Temperature Cells," Fuel Cells: A Review of Government-Sponsored Research, 1950-1964, NASA SP-120, pp. 101-102, (1967).

"Low Cost, Compact Solid Oxide Fuel Cell Generator," (Technology Management Inc.).

"Low Cost, High Efficiency Reversible Fuel Cell (and Electrolyzer) Systems," (Technology Management Inc.), Proceedings of the 2001 DOE Hydrogen Program Review NREL/CP-570-30535, pp. 1-7, (2001).

Milliken et al., "Low Cost, High Efficiency Reversible Fuel Cell Systems," Proceedings of the 2002 U.S. DOE Hydrogen Program Review, NREL/CP-610-32405, pp. 1-14, (2002).

Mitlitsky, et al., "Regenerative Fuel Cells for High Altitude Long Endurance Solar Powered Aircraft," Intersociety Energy Conversion Engineering Conference (IECEC), UCRL-JC-113485, pp. 1-8, (Jul. 28, 1993).

Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).

Ruhl, "Low Cost Reversible Fuel Cell System," Proceedings of the 2000 U.S. DOE Hydrogen Program Review, NREL/CP-570-28890, pp. 1-9, (Jun. 15, 2000).

"Small, Ultra Efficient Fuel Cell Systems," (Technology Management Inc.), Advanced Technology Program ATP 2001 Competition, pp. 1-2, (Jun. 2002).

Supplemental European Search Report and Opinion, Intl. Application PCT/US2008/009069, dated Nov. 4, 2011, 5 pages.

"Type BPL Granular Carbon", Calgon Product Bulletin, Calgon Corporation, Activated Carbon Division, 2 pgs.

Berlier, Karl et al., "Adsorption of $CO_2$ on Microporous Materials. 1. On Activated Carbon and Silica Gel", J. Chem. Eng. Data, 1997, vol. 42, pp. 533-537.

EG & G, Parsons, Inc., SAIC. Fuel Cell Handbook. 5$^{th}$ Edition. USDOE. Oct. 2000. 9-1-9-4; 9-12-9-14.

LeVan, M. Douglas et al., "Adsorption and Ion Exchange", Perry's Chemical Engineers' Handbook (7$^{th}$ Edition), 1997, 66 pgs.

Levan, M. Douglas et al., "Fixed-Bed Adsorption of Gases: Effect of Velocity Variations on Transition Types", AIChE Journal, vol. 34, No. 6, Jun. 1988, pp. 996-1005.

(56) References Cited

OTHER PUBLICATIONS

Manchado, M. Cabrejas et al., "Adsorption of $H_2$, $O_2$, CO, and $CO_2$ on a γ-Alumina: Volumetric and Calorimetric Studies", Langmuir, vol. 10, 1994, pp. 685-691.

Olivier, Marie-Georges et al., "Adsorption of Light Hyrdocarbons and Carbon Dioxide on Silica Gel", J. Chem. Eng. Data, 1997, vol. 42, pp. 230-233.

Qi, Nan et al., "Adsorption equilibrium modeling for water on activated carbons", Carbon, vol. 43, 2005, pp. 2258-2263.

Rudisill, Edgar N. et al., "Coadsorption of Hydrocarbons and Water on BPL Activated Carbon", Ind. Eng. Chem. Res., 1992, vol. 31, pp. 1122-1130.

Sward, Brian K. et al., "Simple Flow-Through Apparatus for Measurement of Mass Transfer Rates in Adsorbent Particles by Frequency Response", Fundementals of Adsorption, K. Kaneko et al., eds., vol. 7, 2002, pp. 29-36. Published by IK International of Japan.

Sward, Brian K. et al., "Frequency Response Method for Measuring Mass Transfer Rates in Adsorbents via Pressure Perturbation", Adsorption, vol. 9, 2003, pp. 37-54.

Walton, Krista S. et al., "A Novel Adsorption Cycle for $CO_2$ Recovery: Experimental and Theoretical Investigations of a Temperature Swing Compression Process", Revised Manuscript, submitted in 1995 to Separation Science & Technology, 30 pgs.

Yang, Ralph T., "Adsorbents: Fundamentals and Applications", 2003, 4 pgs.

Yong, Zou et al., "Adsorption of Carbon Dioxide on Basic Alumina at High Temperatures", J. Chem. Eng. Data, 2000, vol. 45, pp. 1093-1095.

Yong, Zou et al., "Adsorption of carbon dioxide at high temperature—a review", Separation and Purification Technology, vol. 26, 2002, pp. 195-205.

Supplemental European Search Report and European Search Opinion, EP Application No. 06800263, dated Oct. 16, 2009, 11 pgs.

Notification of Reasons of Refusal issued in Japanese Patent Application No. 2008-524022, dated Jan. 24, 2012.

\* cited by examiner

SOLID OXIDE FUEL CELL SYSTEM AND METHOD OF OPERATING THE SAME USING PEAK SHAVING GAS

FIELD

Aspects of the present invention relate to fuel cell systems and methods, and more particularly, to a fuel cell system and method of using peak shaving gas.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments, provided is a fuel cell system comprising: a fuel inlet configured to receive fuel from a fuel source; a catalytic partial oxidation (CPOx) reactor configured to partially oxidize the fuel during startup of the system; a blower configured to provide air to the CPOx reactor; a gas analyzer configured to determine a composition of fuel provided to the CPOx reactor from the fuel inlet; an oxidation catalyst configured to reduce an $O_2$ content of fuel received from the CPOx reactor; a reforming catalyst configured to at least partially reform fuel received from the oxidation catalyst; and a stack comprising fuel cells configured to generate electricity using fuel received from the reforming catalyst.

According to various embodiments of the present disclosure, provided is a method of operating a fuel cell system using a peak shaving fuel, the method comprising: determining the composition of a fuel stream provided to the fuel cell system; injecting air into the fuel stream, if ethane, propane, or ethane and propane content of the fuel stream is determined to be greater than about 9 vol %; providing the fuel stream to a reforming catalyst to generate a reformed fuel; and providing the reformed fuel to a fuel cell stack.

According to various embodiments of the present disclosure, provided is a method of operating a fuel cell system using a peak shaving fuel, the method comprising providing a fuel stream comprising the peak shaving fuel to an oxidation catalyst to catalyze a reaction between any $O_2$ included in the fuel stream and at least one of $H_2$ and CO included in the fuel stream; providing the fuel stream to a hydrogenation catalyst to catalyze a saturation reaction between any unsaturated hydrocarbons included in the fuel stream and the $H_2$ included in the fuel stream; providing the fuel stream from the hydrogenation catalyst to the reforming catalyst to generate a reformed fuel; and providing the reformed fuel to a fuel cell stack.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1:
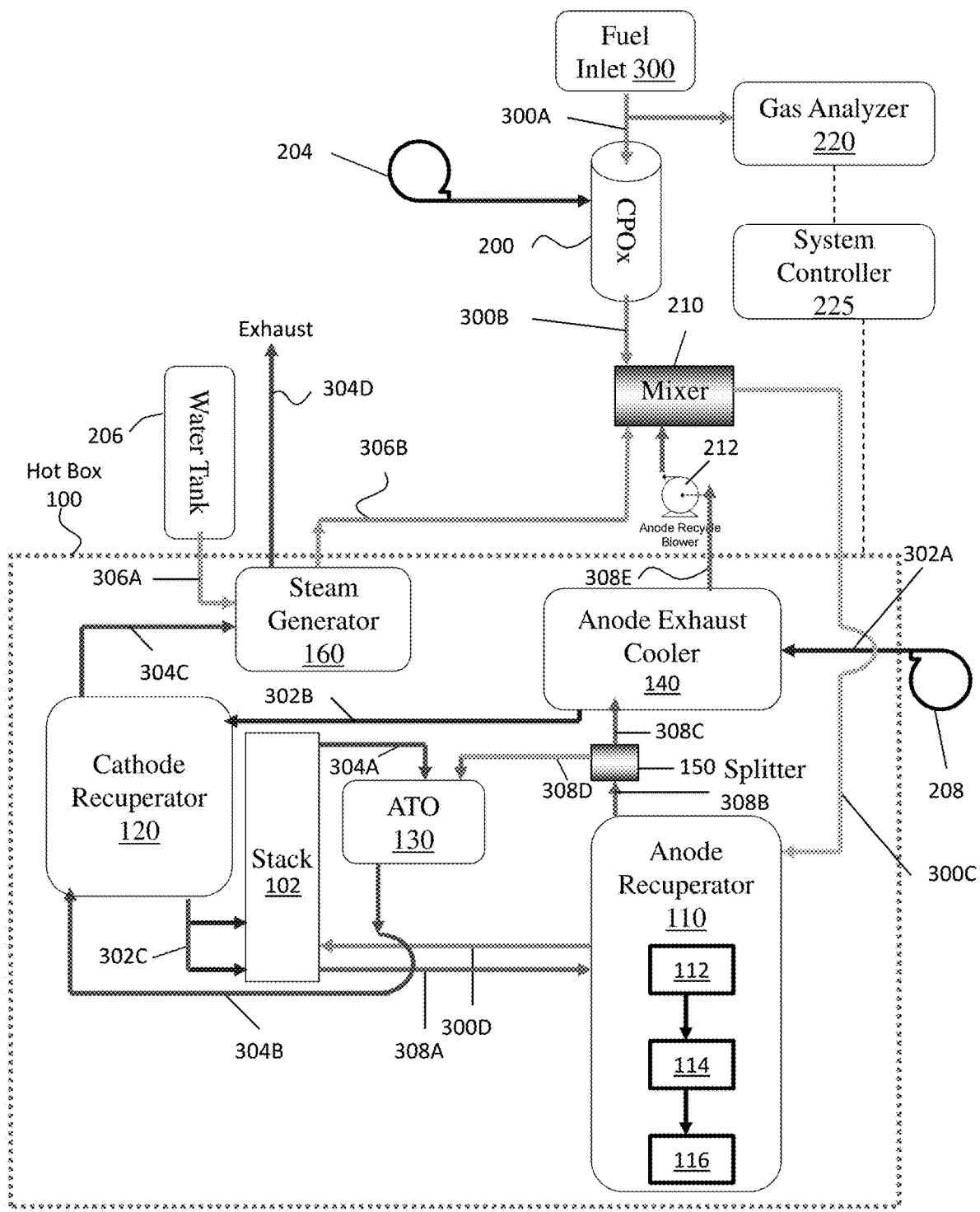
FIG. 1 is a schematic of a SOFC fuel cell system, according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Solid oxide fuel cell (SOFC) systems are generally configured to operate most efficiently using natural gas. However, many gas utilities mitigate peak winter demands by using propane peak shaving and standby systems. Most of these systems produce "propane-air" for direct replacement of natural gas during peak demand periods. Typical delivered compositions can be as high as around 30% propane, 25% air, and 45% methane, however some regions may be as low as 1%/1% propane/air (e.g., liquid propane air (LPA) and natural gas mixture). In conventional SOFC systems, the inclusion of air appears to facilitate coking and/or deactivation of reformation catalysts, which may lead to coking and deactivation of fuel cell anodes.

Other peak shaving gases may include higher hydrocarbons including more carbon atoms than methane, such as ethane, ethene, propane, propene, butane, pentane, isopentane, hexane, etc. Typical hydrocarbon fuels include saturated alkenes, such as ethane and propane ($C_2H_6$ and $C_3H_8$). Unsaturated alkenes, such as ethylene and propylene ($C_2H_4$ and $C_3H_6$) are not a normal constituent of natural gas in North America or worldwide, but may be introduced into some natural gas networks as a result of refining and chemical engineering processes (such as refinery by-products). However, unsaturated alkenes may result in the surface deposition of carbon (i.e., coking) with respect to various elements of fuel cell systems. For example, the coking may result in deactivation of catalyst surfaces and may provide nucleation sites for the creation of more coke. Once the coking process begins, the lifetime of a catalytic reactor may be severely compromised. Therefore, the prevention of coke formation is of high importance in reforming process engineering, in order to allow fuel cell systems to operate using fuels that contain unsaturated alkenes.

Exemplary fuels including higher hydrocarbons may be comprised of a combination of various molecules including CO, $CO_2$, $H_2O$, $H_2$, $O_2$, $N_2$, Ar, $CH_4$, $C_2H_6$, $C_2H_4$, $C_3H_8$, $C_3H_6$, n-$C_4H_{10}$ (n-butane), i-$C_4H_{10}$ (isobutane), $C_5H_{12}$, and $C_6H_{14}$ and the various molecules may represent different molecular fractions (or percentages) of the overall fuel. As examples, $CH_4$ may comprise from less than 96% of the molecules in the fuel in the fuel inlet stream, e.g., 40.496% to 95.994% of the molecules, $C_2H_6$ may comprise from 1.250% and 8.00% of the molecules in the fuel in the fuel inlet stream, $C_2H_4$ may comprise from 0.040% to 8.00% of the molecules in the fuel in the fuel inlet stream, $C_3H_8$ may comprise from 0.360% to 30.760% of the molecules in the fuel in the fuel inlet stream, $C_3H_6$ may comprise from 0.001% to 1.620% of the molecules in the fuel in the fuel inlet stream, $n-C_4H_{10}$ may comprise from 0.001% to 0.400% of the molecules in the fuel in the fuel inlet stream, $i-C_4H_{10}$ may comprise from 0.001% to 0.200% of the molecules in the fuel in the fuel inlet stream, $C_5H_{12}$ may comprise from 0.001% to 0.090% of the molecules in the fuel in the fuel inlet stream, and $C_6H_{14}$ may comprise from 0.001% to 0.030% of the molecules in the fuel in the fuel inlet stream. Six exemplary fuel compositions are shown in Table I below.

TABLE I

| Mole Fraction | Natural Gas (from PG&E) | Peak Shave Natural Gas High Propane, High Air | Peak Shave Natural Gas Lower Propane, Lower Air | Natural Gas Injected with Refinery Gases | Natural Gas with higher Ethane and Propane High Ethane | Natural Gas with higher Ethane and Propane Medium Ethane |
|---|---|---|---|---|---|---|
| CO | 0.001% | 0.001% | 0.001% | 0.001% | 0.001% | 0.001% |
| $CO_2$ | 1.300% | 0.300% | 0.360% | 4.000% | 1.300% | 2.200% |
| $H_2O$ | 0.001% | 0.001% | 0.001% | 0.001% | 0.001% | 0.001% |
| $H_2$ | 0.001% | 0.001% | 0.001% | 2.000% | 0.001% | 0.001% |
| $O_2$ | 0.001% | 5.300% | 4.280% | 0.001% | 0.001% | 0.001% |
| $N_2$ | 0.400% | 20.040% | 16.200% | 0.001% | 0.400% | 0.400% |
| Ar | 0.001% | 0.001% | 0.001% | 0.001% | 0.001% | 0.001% |
| $CH_4$ | 95.994% | 40.496% | 48.946% | 74.991% | 84.114% | 88.102% |
| $C_2H_6$ | 1.760% | 1.250% | 1.550% | 8.000% | 8.000% | 6.500% |
| $C_2H_4$ | 0.001% | 0.060% | 0.040% | 8.000% | 0.001% | 0.001% |
| $C_3H_8$ | 0.360% | 30.760% | 27.910% | 1.000% | 6.000% | 2.100% |
| $C_3H_6$ | 0.001% | 1.620% | 0.500% | 2.000% | 0.001% | 0.001% |
| $n-C_4H_{10}$ | 0.020% | 0.050% | 0.060% | 0.001% | 0.020% | 0.400% |
| $i-C_4H_{10}$ | 0.070% | 0.050% | 0.060% | 0.001% | 0.070% | 0.200% |
| $C_5H_{12}$ | 0.088% | 0.040% | 0.060% | 0.001% | 0.088% | 0.090% |
| $C_6H_{14}$ | 0.001% | 0.030% | 0.030% | 0.001% | 0.001% | 0.001% |

In conventional SOFC systems, the inclusion of air and/or higher hydrocarbons in a peak shaving fuel appears to facilitate coking and/or deactivation of reformation catalysts, which may lead to coking and deactivation of fuel cell anodes. Accordingly, there is a need for a SOFC system that is configured to operate using a wide variety of peak shaving gas compositions, without suffering from coking and/or catalyst deactivation.

FIG. 1 is a schematic representation of a SOFC system 10, according to various embodiments of the present disclosure. Referring to FIG. 1, the system 10 includes a hotbox 100 and various components disposed therein or adjacent thereto.

The hot box 100 may contain fuel cell stacks 102, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 102 may be arranged over each other in a plurality of columns.

The hot box 100 may also contain an anode recuperator 110, a cathode recuperator 120, an anode tail gas oxidizer (ATO) 130, an anode exhaust cooler 140, a splitter 150, and a steam generator 160. The system 10 may also include a catalytic partial oxidation (CPOx) reactor 200, a mixer 210, a CPOx blower 204 (e.g., air blower), a system blower 208 (e.g., air blower), and an anode recycle blower 212, which may be disposed outside of the hotbox 100. However, the present disclosure is not limited to any particular location for each of the components with respect to the hotbox 100.

The CPOx reactor 200 receives a fuel inlet stream from a fuel inlet 300, through fuel conduit 300A. The fuel inlet 300 may be a utility gas line including a valve to control an amount of fuel provided to the CPOx reactor 200. The CPOx blower 204 may provide air to the CPOx reactor 202. The fuel and/or air may be provided to the mixer 210 by fuel conduit 300B. Fuel (e.g., the fuel stream 1721 described below with respect to FIGS. 4A-4C) flows from the mixer 210 to the anode recuperator 110 through fuel conduit 300C. Fuel flows from the anode recuperator 110 to the stack 102 through fuel conduit 300D.

The main air blower 208 may be configured to provide an air stream (e.g., air inlet stream) to the anode exhaust cooler 140 through air conduit 302A. Air flows from the anode exhaust cooler 140 to the cathode recuperator through air conduit 302B. The air flows from the cathode recuperator 120 to the stack 102 through air conduit 302C.

Anode exhaust (e.g., the fuel exhaust stream 1723 described below with respect to FIGS. 4A-4C) generated in the stack 102 is provided to the anode recuperator 110 through recycling conduit 308A. The anode exhaust may contain unreacted fuel. The anode exhaust may also be referred to herein as fuel exhaust. The anode exhaust may be provided from the anode recuperator 110 to a splitter 150 by recycling conduit 308B. A first portion of the anode exhaust may be provided from the splitter 150 to the anode exhaust cooler 140 by exhaust conduit 308C. A second portion of the anode exhaust may be provided from the splitter 150 to the ATO 130 by recycling conduit 308D. Anode exhaust may be provided from the anode exhaust cooler 140 to mixer 210 by exhaust conduit 308E. The anode recycle blower 212 may be configured to move anode exhaust though recycling conduit 308E, as discussed below.

Cathode exhaust generated in the stack 102 flows to the ATO 130 through exhaust conduit 304A. Cathode exhaust and/or ATO exhaust generated in the ATO 130 flows from the ATO 130 to the cathode recuperator 120 through exhaust conduit 304B. Exhaust flows from the cathode recuperator 120 to the steam generator 160 through exhaust conduit 304C. Exhaust flows from the steam generator 160 and out of the hotbox 100 through exhaust conduit 304D.

Water flows from a water source 206, such as a water tank or a water pipe, to the steam generator 160 through water conduit 306A. The steam generator 160 converts the water into steam using heat from the ATO exhaust provided by exhaust conduit 304C. Steam is provided from the steam generator 160 to the mixer 210 through water conduit 306B. Alternatively, if desired, the steam may be provided directly into the fuel inlet stream and/or the anode exhaust stream may be provided directly into the fuel inlet stream followed by humidification of the combined fuel streams. The mixer 210 is configured to mix the steam with anode exhaust and fuel. This fuel mixture may then be heated in the anode recuperator 110, before being provided to the stack 102.

The system 10 may further include a gas analyzer 220 configured to analyze the fuel in fuel conduit 300A and a system controller 225 configured to control various elements of the system 10. The controller 225 may include a central processing unit configured to execute stored instructions. For example, the controller 225 may configured to control fuel and/or air flow through the system 10, according to fuel composition data received from the gas analyzer 220, as discussed in detail below. The system 10 may also include one or more fuel catalysts 112, 114, and 116, as discussed below.

Figure 2:
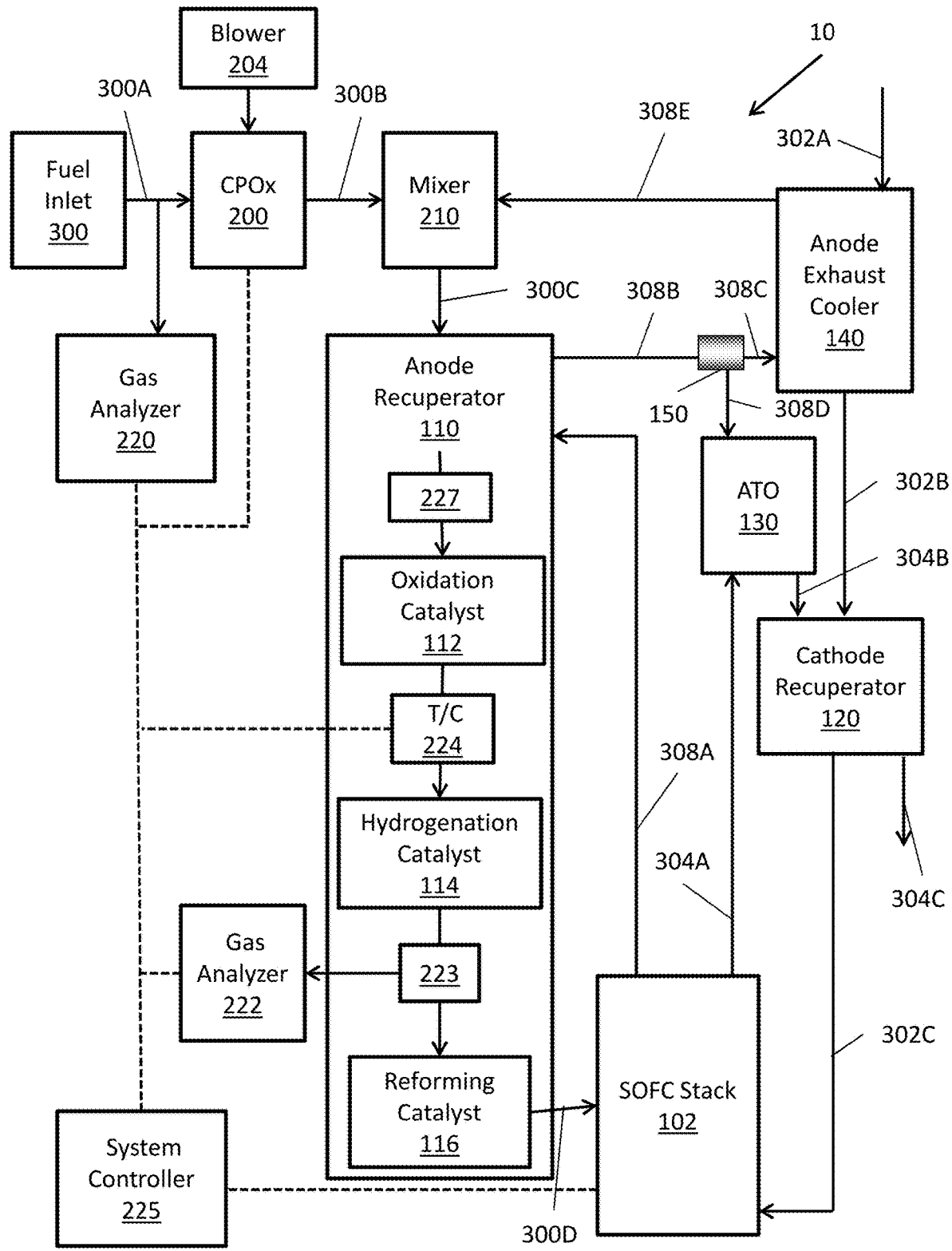
FIG. 2 is a schematic showing fuel flow through the fuel cell system of FIG. 1.

FIG. 2 is a flow diagram showing fuel flow through the system 10, according to various embodiments of the present disclosure. Referring to FIGS. 1 and 2, fuel flows from the fuel inlet 300 into the CPOx reactor 200 during all modes of operation (e.g., during startup, steady state, and shutdown operations). The fuel may include a hydrocarbon fuel such as ethane or propane. The fuel may also include unsaturated alkenes, such as ethylene and propylene. The fuel may also include a certain amount of oxygen, such as part of the "propane-air" discussed above.

The gas analyzer 220 may be any detector configured to detect natural gas content, such as a hydrocarbon detector, a natural gas detector, a flame ionization detector, and/or an optical detector. For example, the gas analyzer 220 may be an infrared absorption based on-line monitoring system configured for measurement of alkanes: methane, ethane, propane, butanes and pentanes, such as a Precisive hydrocarbon composition analyzer (HCA) manufactured by MKS Instruments, Inc. The gas analyzer may also include an optional oxygen sensor.

The gas analyzer 220 may be configured provide gas content to the overall fuel cell system controller 225, which may be configured to control one or more fuel cell stacks and/or systems at a given site (e.g., by increasing or decreasing an amount of fuel using a valve in the fuel inlet 300, and/or by increasing or decreasing a stack voltage or current, and/or by adjusting the speed of a fuel recycle blower 212 to control fuel utilization). This information may also be disseminated down to the individual fuel cell controllers for use in the control system algorithms. This information could be particularly useful for sensing substantial changes in gas quality/composition, and making according changes in control systems.

During a cold startup the fuel is partially oxidized in the CPOx reactor 200 by injection of air from the CPOx blower 204. The CPOx reactor 200 may include a glow plug to initiate this catalytic reaction. During this cold-start operational mode the CPOx reactor 200 may be operated at a temperature ranging from about 600° C. to about 800° C., such as from about 650° C. to about 750° C., or about 700° C. The CPOx blower 204 generally operates during startup, and is usually not operated during steady-state system operation.

However, when the gas analyzer 220 detects a high inlet ethane and/or propane concentration (e.g., a peak shaving event) during steady-state operation, the CPOx blower 204 may be operated to inject air into the fuel stream, without igniting the CPOx reaction (e.g., without operating a glow plug therein). As a result, some of the ethane may be converted to lower hydrocarbons downstream in the process by this injection. This method of air injection may be particularly applicable to SOFC systems that do not include a reformation catalyst configured to catalyze ethane and/or propane without a high probability of coking. In addition, this method may also be used with SOFC systems that do include such a reformation catalyst, when an ethane concentration exceeds the reformation capability thereof. For example, generally reformation catalysts may be configured to reform gas mixtures that contain less than about 15%, such as less than about 12%, or less than about 9% ethane and/or propane.

The fuel flows from the CPOx reactor 200 into the mixer 210, where it may be mixed with steam and/or anode exhaust stream in conduit 308E. The fuel then flows into the anode recuperator 110, where it is heated using hot anode exhaust emitted from the stack 102 via conduit 308A.

One or more of the catalysts 112, 114, 116 may be disposed within the anode recuperator 110, according to some embodiments. For example, one or more of the catalysts 112, 114, 116 may be disposed between walls of the anode recuperator 110, or may be disposed in an opening formed within the anode recuperator 110. In other embodiments, one or more of the catalysts 112, 114, 116 may be in the form of pucks or disks. In other embodiments, one or more of the catalysts 112, 114, 116 may be disposed outside of the anode recuperator 110 (e.g., upstream or downstream of the anode recuperator). In various embodiments, the catalysts 112, 114, 116 may include a metallic/ceramic foam with a catalytic layer (e.g., palladium, nickel and/or rhodium), a metallic/ceramic foam without a catalytic layer where the base metal of the foam is catalytically active (e.g., nickel), a large number of coiled wires with a catalytic layer, a packed bed of catalyst pellets, or any combination thereof.

The heated fuel enters an oxidation catalyst 112 either upstream of the anode recuperator 110 (if the oxidation catalyst 112 is located upstream of the anode recuperator 110) or while traveling through the anode recuperator 110 (if the oxidation catalyst 112 is located in the anode recuperator 110). The oxidation catalyst 112 may be a catalytic reactor configured to remove free oxygen ($O_2$) from the fuel. For example, the oxidation catalyst 112 may facilitate the reaction of oxygen with $H_2$, CO, and/or other natural gas components in the fuel. The removal of free oxygen prevents or reduces the oxidation of a reforming catalyst 116. The oxidation of the reforming catalyst 116 is thought to contribute to catalyst coking.

When there is no oxygen present in the fuel, the oxidation catalyst 112 may induce a small pressure drop to the fuel stream, such as approximately 10% or less of the normal reformer pressure loss. The oxidation catalyst 112 may be configured to operate at temperatures that can readily be achieved by heating with the anode exhaust. For example, the oxidation catalyst 112 may be configured to operate at temperatures ranging from about 100° C. to about 200° C., such as from about 125° C. to about 175° C., or about 150° C.

The oxidation catalyst 112 may include a nickel/rhodium catalyst layer on a ceramic base (e.g., support). The catalyst layer may also include other base metals such as zinc, cobalt and/or copper. The ceramic base of the oxidation catalyst may comprise any suitable ceramic base material, such as alumina, stabilized zirconia, lanthana and/or ceria. The oxidation catalyst 112 may be configured to remove from at least 90%, such as at least about 95%, at least about 97%, at least about 98%, or at least about 99% of the oxygen from the fuel. The oxidation catalyst 112 may be configured to remove free oxygen without excessive reformation of methane. For example, the oxidation catalyst 112 may be configured to reform less than about 20%, such as less than about 18%, less than about 15%, less than about 12%, or less than about 10% of the methane and/or other higher hydrocarbons included in the fuel. In various embodiments, the catalyst may be configured explicitly so as not to catalyze hydrocarbon reformation reactions.

The system 10 may optionally include a thermocouple (T/C) 224, or similar temperature detector, configured to detect the temperature of the fuel exiting the oxidation catalyst 112. An increase in the detected temperature may be used to determine the approximate content of one or more components of the fuel, such as whether oxygen is present in the fuel and/or specific hydrocarbon levels in the fuel. In some embodiments, the system may also include a T/C 227 configured to detect the temperature of fuel entering the oxidation catalyst 112, such that a temperature change of the fuel passing through the oxidation catalyst may be detected.

The fuel may then flow into a hydrogenation catalyst 114. The hydrogenation catalyst 114 may be a catalytic reactor configured to combine unsaturated hydrocarbons, such as ethylene and/or propylene (alkenes), with available hydrogen in the fuel stream, resulting in saturated hydrocarbons, such as ethane and propane or other alkanes.

The hydrogenation catalyst 114 may include a ceramic base, such as alumina, ceria, zirconia, or a mixture of ceria and zirconia, with a small percentage of a catalyst metal such as palladium. For example, the hydrogenation catalyst 114 may include an amount of palladium ranging from about 0.1 wt % to about 5 wt %. The hydrogenation catalyst 114 may be configured to operate at temperatures ranging from about 200° C. to about 450° C., such as from about 225° C. to about 425° C., or from about 250° C. to about 400° C. The hydrogenation catalyst 114 may be located in the anode recuperator 110.

The system 10 may include a sampling port 223 disposed adjacent an exit of the hydrogenation catalyst 114. For example, a gas analyzer 222 may be disposed at the sampling 223 port and may be configured as a general gas composition instrument, or an instrument configured to detect one water vapor content and/or more specific gas components.

The fuel then flows into a reforming catalyst 116. The reforming catalyst 116 may be a catalytic reactor configured to partially reform the fuel before the fuel is delivered to the stack 102. The reformation reaction is endothermic (e.g., a steam methane reformation (SMR) reaction) and may operate to cool the fuel prior to feeding the stack. The reforming catalyst 116 may include one or more nickel/rhodium catalysts configured to reform higher hydrocarbons (C2-C5) at very broad steam to carbon ratios. For example, the reforming catalyst 116 may be configured to reform a fuel stream having at least 10 vol % of C2 and C3 hydrocarbons, without significant coke formation. For example, the reforming catalyst 116 may be configured to reform a fuel stream having up to 20 vol %, up to 18 vol %, up to 16 vol %, up to 14 vol %, or up to 12 vol % of C2 and C3 hydrocarbons.

The fuel is then reacted in the stack 102, and the resultant anode exhaust may include unreacted fuel components. The anode exhaust may be provided to the anode recuperator 110 to heat the incoming fuel. The anode exhaust may then be provided to the anode exhaust cooler 140, where the anode exhaust may be used to heat air entering the system 10, such as air provided by the system blower 208.

The system controller 225 may be configured to adjust a fuel flow rate from the fuel inlet 300, an air flow rate from the CPOx blower 204, and/or a speed of the anode recycle blower 212, based on the composition of the fuel. For example, the fuel flow rate may be increased to prevent starvation of the stack 102, when the free oxygen content of the fuel is high, since fuel is consumed when the oxygen is removed in the oxidation catalyst 112.

The system controller 225 may also use other feedback signals to determine correct fuel flow rate, such as stack voltage at operating current and the temperature of the ATO 130, in order to detect and/or respond to a peak shaving event. For example, a reduction in the temperature of the ATO 130 and/or a reduction in the fuel cell stack 102 voltage may indicate that the stack 102 is starved for fuel. If the fuel flow rate is too high, the temperature of the ATO 130 may rise above a normal operating temperature and/or the stack voltage may also experience a similar increase. In some embodiments, the controller 225 may be configured to compare the measured stack voltage to a recent history of stack voltage at a similar current level, when no peak shaving event was occurring, in order to determine whether fuel flow, anode exhaust recycle flow, and/or air flow should be adjusted.

In some embodiments, the controller 225 may be configured to receive a supervisory control and data acquisition (SCADA) signal from a gas utility before a peak shaving event occurs. The signal may include the composition of the peak shaving gas and/or the timing of the peak shaving event. The controller 225 may be configured to control the operation of the system 10, based on the signal. For example, the controller 225 cause the system 10 to return to normal operation after the peak shaving event expires.

Accordingly, the fuel cell system 10 may be configured to operate in a broad range of fuel environments, which may allow for the system 10 to be implemented in areas where operation was previously difficult or impractical because of prohibitive levels of air, propane, and/or ethane, ethylene, propylene, is provided in fuel. The system 10 may also provide for increased fuel cell stack life by providing more consistent pre-reformation across the whole range of natural gas quality/composition.

Figure 3A:
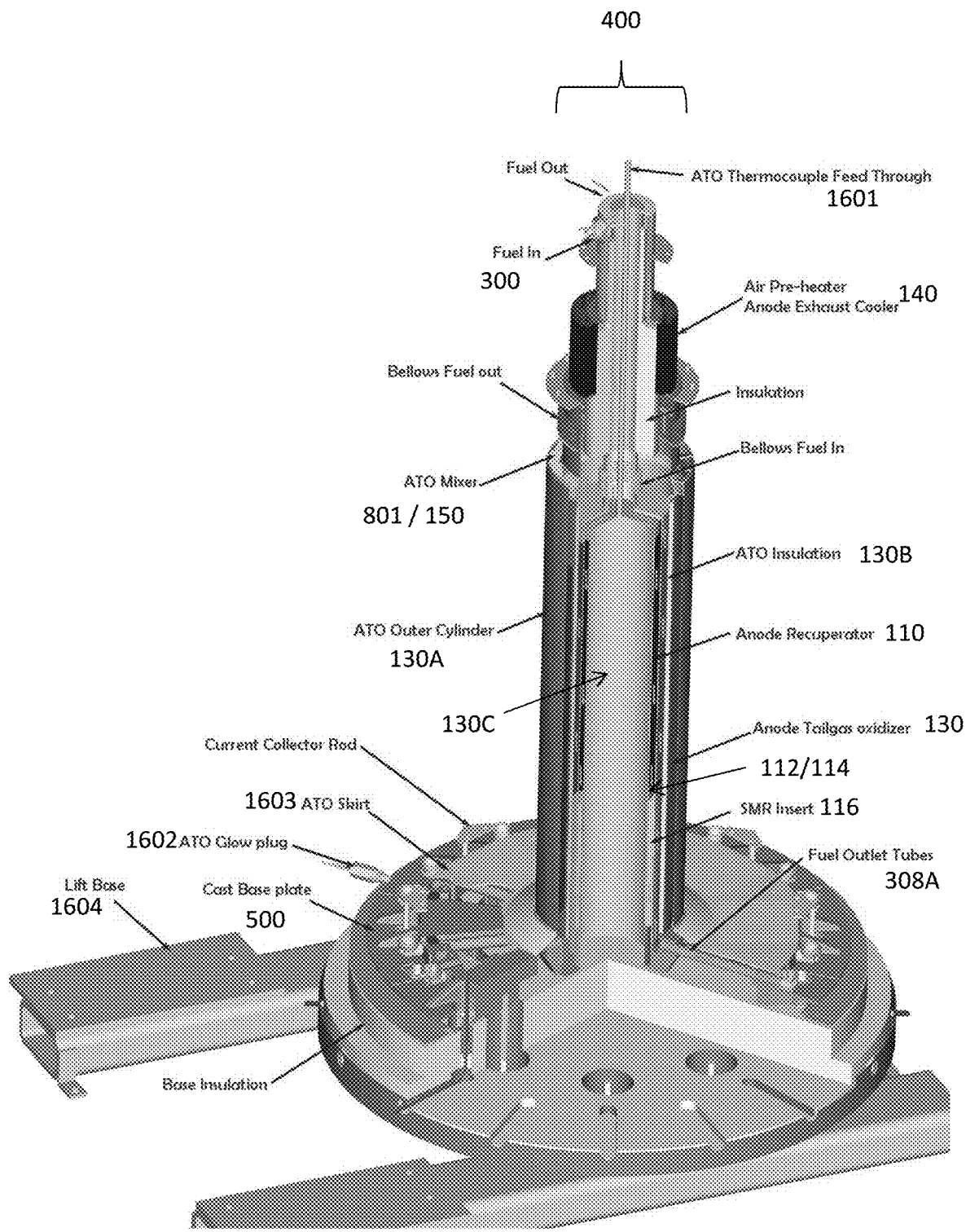
FIG. 3A is a sectional perspective view of a central column of the fuel cell system of FIG. 1.
Figure 3B:
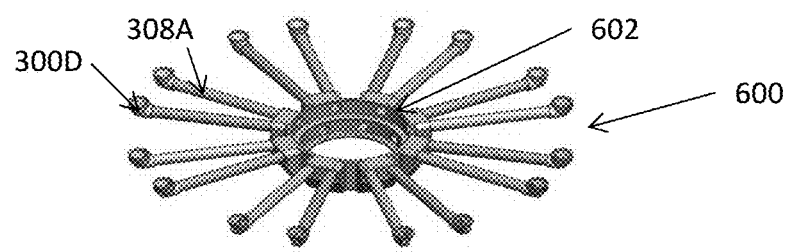
FIG. 3B illustrates an anode hub structure connected to the column of FIG. 3A.

FIG. 3A illustrates a central column 400 of the system 10, according to various embodiments of the present disclosure. FIG. 3B illustrates an anode hub structure 600 disposed in a hot box base 500 on which the column 400 may be disposed. Referring to FIGS. 3A and 3B, fuel cell stacks (not shown) may be disposed around the column 400, on the hot box base 500. The column 400 includes the anode recuperator 110, the ATO 130, and the anode exhaust cooler 140. In particular, the anode recuperator 110 is disposed radially inward of the ATO 130, and the anode exhaust cooler 140 is mounted over the anode recuperator 110 and the ATO 130. The oxidation catalyst 112 and/or the hydrogenation catalyst 114 may be located in the anode recuperator 110. The reforming catalyst 116 may also be located at the bottom of the anode recuperator 110 as a steam methane reformation (SMR) insert.

The ATO 130 comprises an outer cylinder 130A that is positioned around inner ATO insulation 130B/outer wall of the anode recuperator 110. Optionally, the insulation 130B may be enclosed by an inner ATO cylinder 130C. Thus, the insulation 130B may be located between the anode recuperator 110 and the ATO 130. An ATO oxidation catalyst may be located in the space between the outer cylinder 130A and the ATO insulation 130B. An ATO thermocouple feed through 1601 extends through the anode exhaust cooler 140, to the top of the ATO 130. The temperature of the ATO 130 may thereby be monitored by inserting one or more thermocouples (not shown) through this feed through 1601.

The anode hub structure 600 is positioned under the anode recuperator 110 and ATO 130 and over the hot box base 500. The anode hub structure 600 is covered by an ATO skirt 1603. A combined ATO mixer 801 and fuel exhaust splitter 150 is located over the anode recuperator 110 and ATO 130 and below the anode cooler 140. An ATO glow plug 1602, which initiates the oxidation of the stack fuel exhaust in the ATO during startup, may be located near the bottom of the ATO 130.

The anode hub structure 600 is used to distribute fuel evenly from a central plenum to fuel cell stacks disposed around the central column 400. The anode flow hub structure 600 includes a grooved cast base 602 and a "spider" hub of fuel inlet conduits 300D and outlet conduits 308A. Each pair of conduits 300D, 308A connects to a fuel cell stack. Anode side cylinders (e.g., anode recuperator 110 inner and outer cylinders and ATO outer cylinder 130A) are then welded or brazed into the grooves in the base 602, creating a uniform volume cross section for flow distribution as discussed below.

Also illustrated in FIG. 3A, is a lift base 1604 located under the hot box base 500. In an embodiment, the lift base 1604 includes two hollow arms with which the forks of a fork truck can be inserted to lift and move the fuel cell unit, such as to remove the fuel cell unit from a cabinet (not shown) for repair or servicing.

Figure 4C:
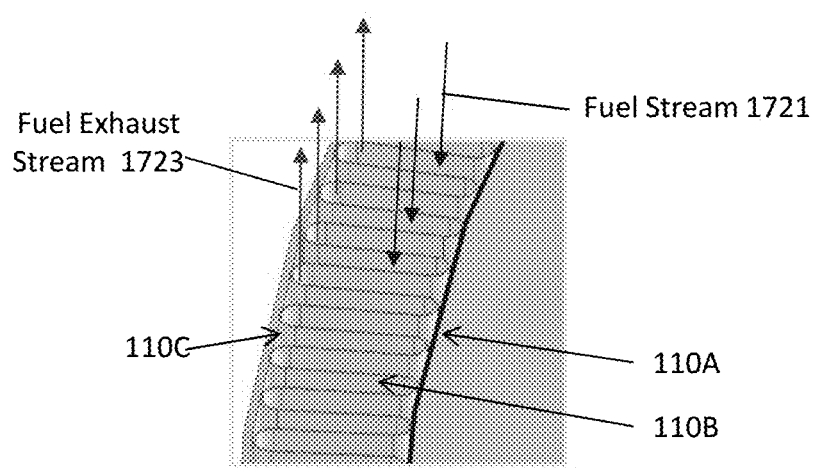
FIGS. 4A-4C are perspective and sectional views of components of the central column of FIG. 3A, according to various embodiments of the present disclosure.
Figure 4A:
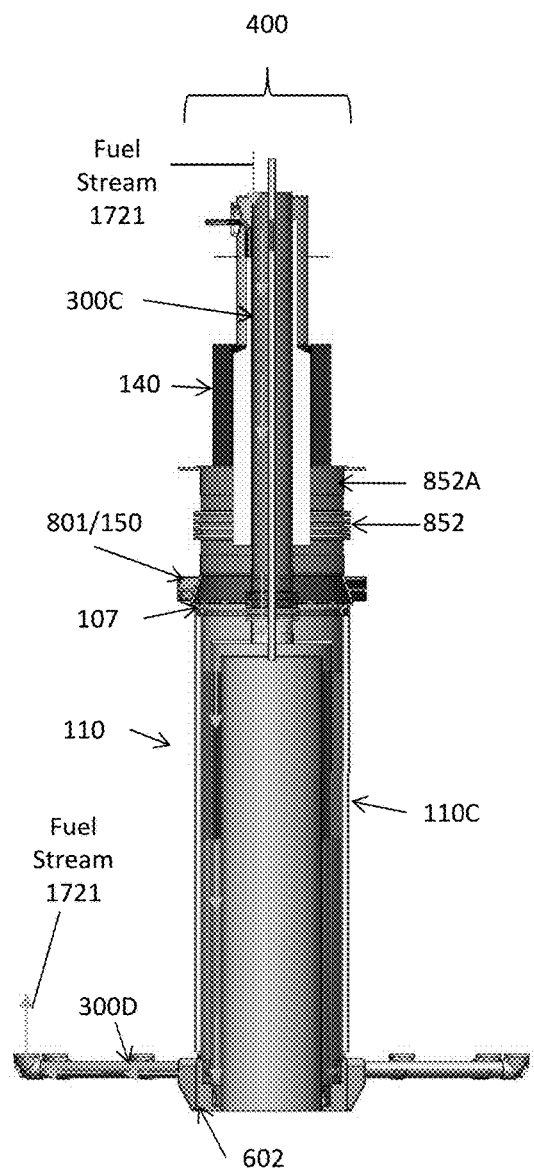
Figure 4B:
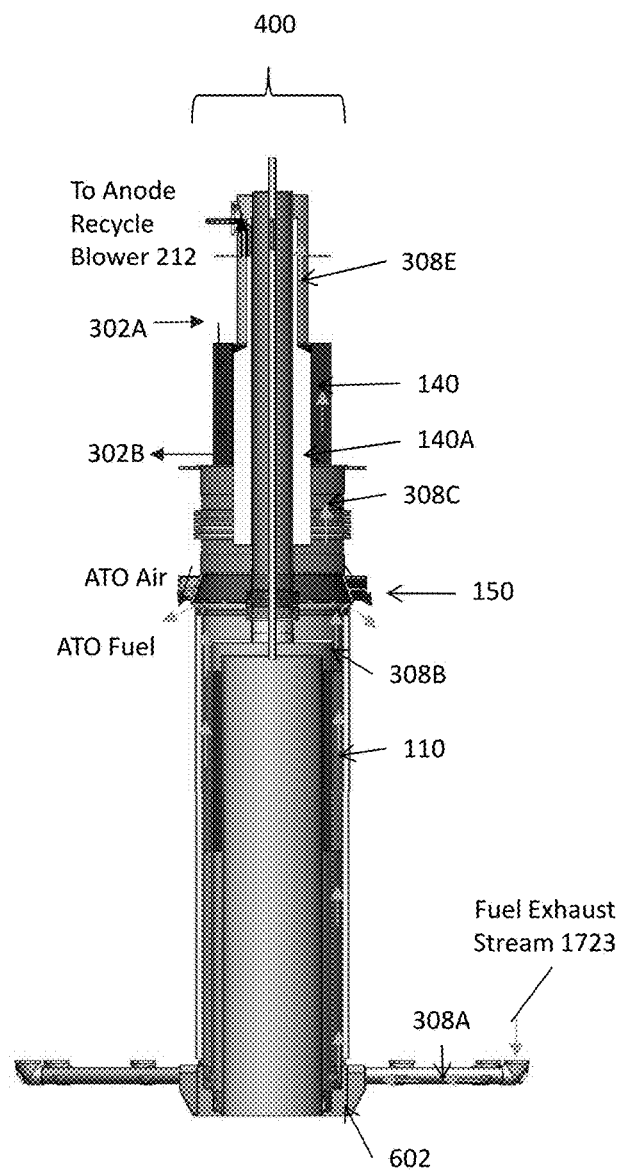

FIGS. 4A and 4B are side cross-sectional views showing flow distribution through the central column 400, and 4C is top cross-sectional view taken through the anode recuperator 110. Referring to FIGS. 1, 4A and 4C, the anode recuperator 110 includes an inner cylinder 110A, a corrugated plate 110B, and an outer cylinder 110C that may be coated with the ATO insulation 130B. A fuel stream 1721 from fuel conduit 300C enters the top of the central column 400. The fuel stream 1721 then bypasses the anode cooler 140 by flowing through its hollow core and then flows through the anode recuperator 110, between the outer cylinder 110C and the and the corrugated plate 110B. The fuel stream 1721 then flows through the hub base 602 and conduits 300D of the anode hub structure 600 (FIG. 3B), to the stacks.

Referring to FIGS. 1, 4B and 4C, a fuel exhaust stream 1723 flows from the stacks through conduits 308A into the hub base 602, and from the hub base 602 through the anode recuperator 110, between in inner cylinder 110A and the corrugated plate 110B, and into the splitter 150. A portion of the fuel exhaust flow stream 1723 flows from the splitter 150 to the anode cooler 140 through conduit 308C, while another portion flows from the splitter 150 to the ATO 130 through conduit 308D (see FIG. 1). Anode cooler inner core insulation 140A may be located between the fuel conduit 300C and bellows 852/supporting cylinder 852A located between the anode cooler 140 and the ATO mixer 801, as shown in FIGS. 3, 4B, and 4C. This insulation minimizes heat transfer and loss from the anode exhaust stream in conduit 31 on the way to the anode cooler 140. Insulation 140A may also be located between conduit 300C and the anode cooler 140 to avoid heat transfer between the fuel inlet stream in conduit 300C and the streams in the anode cooler 140. A bellows 852 and a cylinder 852A may be disposed between the anode cooler 140 and the splitter 150.

FIG. 4B also shows air flowing from the air conduit 302A to the anode cooler 140 (where it exchanges heat with the fuel exhaust stream), into conduit 302B to the cathode recuperator 120. Embodiments of the anode flow hub 600 may have one or more of the following advantages: lower cost manufacturing method, ability to use fuel tube in reformation process if required and reduced complexity.

As will be described in more detail below and as shown in FIGS. 1 and 4B, the fuel exhaust stream 1723 exits the anode recuperator 110 and is provided into splitter 150 through conduit 308B. The splitter 150 splits the anode exhaust stream into first and second anode exhaust streams. The first stream is provided to the ATO 130 through conduit 308D. The second stream is provided into the anode cooler 140 through conduit 308C.

The relative amounts of anode exhaust provided to the ATO 130 and the anode exhaust cooler 140 is controlled by the anode recycle blower 212. The higher the blower 212 speed, the larger portion of the fuel exhaust stream is provided into conduit 308C and a smaller portion of the fuel exhaust stream is provided to the ATO 130, and vice-versa. Preferably, the splitter 150 comprises an integral cast structure with the ATO mixer 801.

The anode exhaust provided to the ATO 130 is not cooled in the anode exhaust cooler 140. This allows higher temperature anode exhaust to be provided into the ATO 130 than if the anode exhaust were provided after flowing through the anode exhaust cooler 140. For example, the anode exhaust provided into the ATO 130 from the splitter 150 may have a temperature of above 350° C., such as from about 350 to about 500° C., for example, from about 375 to about 425° C., or from about 390 to about 410° C. Furthermore, since a smaller amount of anode exhaust is provided into the anode cooler 140 (e.g., not 100% of the anode exhaust is provided into the anode cooler due to the splitting of the anode exhaust in splitter 150), the heat exchange area of the anode cooler 140 may be reduced.

The anode exhaust stream provided to the ATO 130 may be combusted and provided to the cathode recuperator 120 through conduit 304B.

Figure 5:
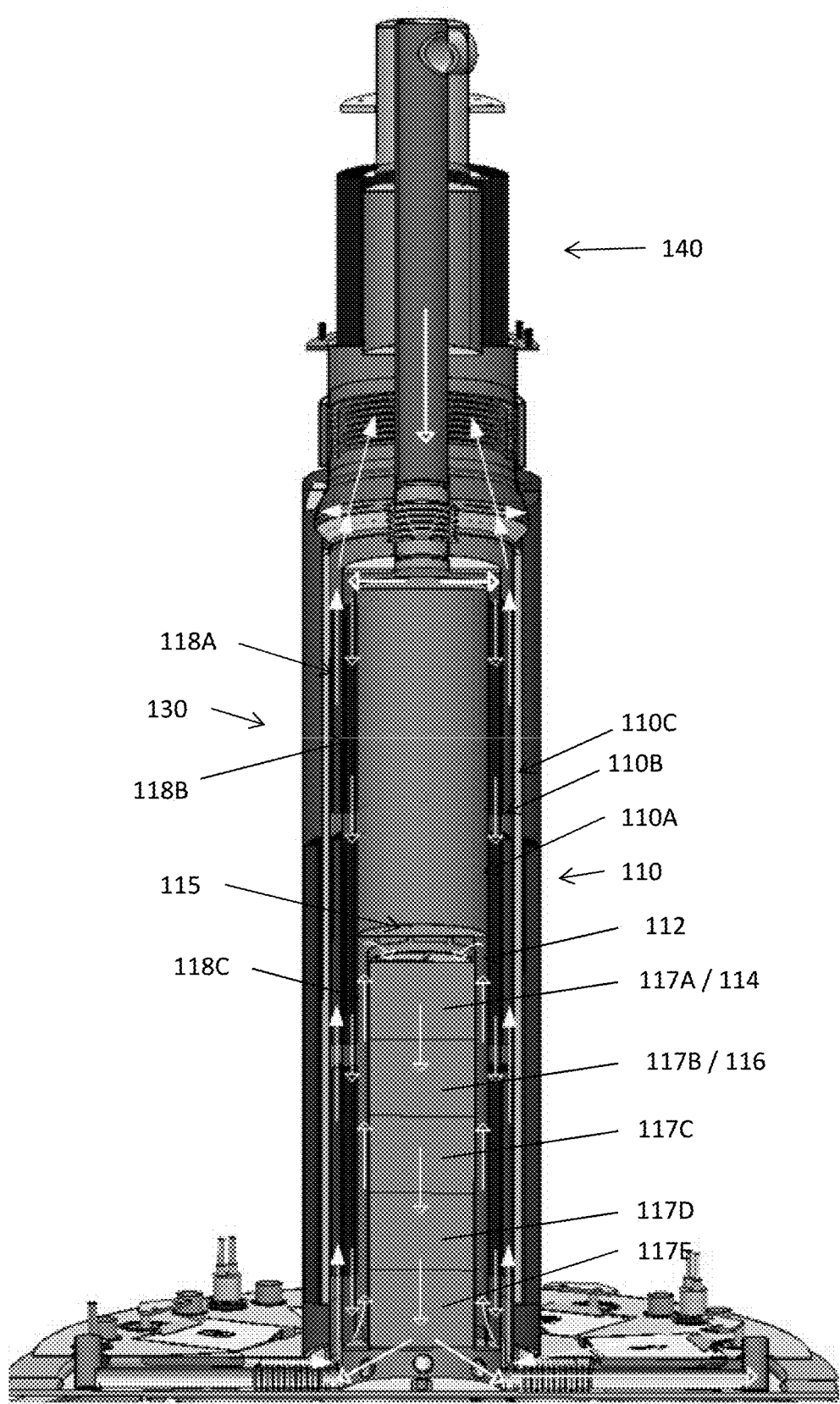
FIG. 5 is a sectional view of a central column of a fuel cell system, according to various embodiments of the present disclosure

FIG. 5 illustrates a modified central column 401 of the system 10, according to various embodiments of the present disclosure. The central column 401 is similar to the central column 400 of FIG. 3, so only the difference therebetween will be described in detail.

Referring to FIG. 5, an oxidation catalyst 112 is disposed in the column 401 between the inner cylinder 110A and corrugated plate 110B of the anode recuperator 110. The column 401 includes a catalyst housing 115 disposed inside a central cavity of the anode recuperator 110. The catalyst housing includes one or more catalyst pucks 117A-117E. Each puck 117 may include the same catalyst, or one or more of the pucks 117 may include different catalysts. For example, puck 117A may include the hydrogenation catalyst 114, and pucks 117B-117E may include one or more reformer catalysts 116.

In some embodiments, the temperature in various portions of the anode recuperator 110 may be controlled by controlling the size and or length of various conduits therein. The target temperature and/or temperature range may be selected based on the properties (e.g., effectiveness, cost, etc.) of the catalyst located within the annular pre-reformer and/or an expected inlet fuel stream composition. As an example, a higher target temperature may be selected to support the conversion of higher hydrocarbons by a less effective catalyst (e.g., all nickel) while a lower target temperature may be selected for use with a more effective catalyst (e.g., all rhodium or all platinum). The target temperature and/or temperature range may be selected to favor the reformation of higher hydrocarbons over the reformation of methane in the pre-reformer (e.g., reforming catalyst 116). In an embodiment, the oxidation catalyst 112 may be located within the anode recuperator 110 but may be separated radially from the annular anode exhaust passage of the anode recuperator 110 by one or more fuel inlet passages (e.g., conduits). For example, as shown in FIG. 5, the oxidation catalyst 112 may be in the form of one or more of the pucks 117A-117E located in the interior of the anode recuperator 110 (e.g., within the inner cylinder 110A which is separated from the anode recuperator fuel exhaust passage 118A by one or more fuel inlet passages 118B and/or 118C passing through the anode recuperator 110). Alternatively, the oxidation catalyst 112 may be located in fuel inlet passage 118C which is separated from the fuel exhaust passage 118A by the initial fuel inlet passage 118B. In this manner, the ambient temperature of the oxidation catalyst 112 may be maintained at a temperature lower than the fuel inlet stream entering the annular pre-reformer from a fuel inlet passage of the anode recuperator 110 and lower than the temperature of the anode exhaust in the anode exhaust passage.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell system comprising:
a fuel inlet configured to receive fuel from a fuel source;
a catalytic partial oxidation (CPOx) reactor configured to partially oxidize the fuel during startup of the system;
a blower configured to provide air to the CPOx reactor;
an infrared absorption gas analyzer configured to determine an alkane composition of fuel provided to the CPOx reactor from the fuel inlet;
an oxidation catalyst configured to reduce an $O_2$ content of fuel received from the CPOx reactor;
a reforming catalyst configured to at least partially reform fuel received from the oxidation catalyst; and
a stack comprising fuel cells configured to generate electricity using fuel received from the reforming catalyst.

2. The system of claim 1, further comprising a controller configured to control at least one of a fuel flow rate through the system, current output by the stack, or a fuel exhaust recycle rate, based on at least the fuel composition determined by the gas analyzer.

3. The system of claim 2, wherein the controller is configured to:
decrease the fuel flow rate, when a voltage of the fuel cell stack exceeds a first voltage; and
increase the fuel flow rate, when the voltage of the fuel cell stack is less than a second voltage that is less than the first voltage.

4. The system of claim 2, wherein the controller is configured to activate the blower during steady-state operation of the system, without igniting fuel in the CPOx reactor, when the gas analyzer detects an ethane content, a propane content, or a combined ethane and propane content, of the fuel exceeds a predetermined percentage.

5. The system of claim 4, wherein the predetermined percentage is about 9 vol %.

6. The system of claim 2, further comprising a hydrogenation catalyst configured to increase a saturated hydrocarbon content of fuel provided to the reforming catalyst from the oxidation catalyst, by catalyzing a reaction between $H_2$ and any unsaturated hydrocarbons present in the fuel.

7. The system of claim 6, further comprising a temperature sensor configured to detect the temperature of fuel provided from the oxidation catalyst to the hydrogenation catalyst,
wherein the controller is configured to increase the fuel flow rate, when the temperature sensor detects a temperature increase corresponding to an increase in oxidation by the oxidation catalyst.

8. The system of claim 7, wherein the hydrogenation catalyst is configured to operate at a temperature ranging from about 250° C. to about 400° C.

9. The system of claim 1, wherein the oxidation catalyst is configured to operate at a temperature ranging from about 125° C. to about 175° C. and wherein the fuel cells comprise solid oxide fuel cells.

10. The system of claim 2, further comprising an anode tail gas oxidizer (ATO) configured to oxidize anode exhaust received from the fuel cell stack,
wherein the controller is configured to:
decrease the fuel flow rate when a temperature of the ATO greater than a predetermined temperature; and
increase the fuel flow rate when the temperature of the ATO is less than a second predetermined temperature.

11. The system of claim 1, further comprising an oxygen sensor in addition to the infrared absorption gas analyzer.

12. A fuel cell system comprising:
a fuel inlet configured to receive fuel from a fuel source;
a catalytic partial oxidation (CPOx) reactor configured to partially oxidize the fuel during startup of the system;
a blower configured to provide air to the CPOx reactor;
a gas analyzer configured to determine a composition of fuel provided to the CPOx reactor from the fuel inlet;
an oxidation catalyst configured to reduce an $O_2$ content of fuel received from the CPOx reactor;
a reforming catalyst configured to at least partially reform fuel received from the oxidation catalyst;
a stack comprising fuel cells configured to generate electricity using fuel received from the reforming catalyst; and
a controller configured to control at least one of a fuel flow rate through the system, current output by the stack, or a fuel exhaust recycle rate, based on at least the fuel composition determined by the gas analyzer, wherein the controller is configured to increase the fuel flow rate, when the gas analyzer detects an $O_2$ content of the fuel that exceeds a predetermined level.

13. A fuel cell system comprising:
a fuel inlet configured to receive fuel from a fuel source;
a catalytic partial oxidation (CPOx) reactor configured to partially oxidize the fuel during startup of the system;
a blower configured to provide air to the CPOx reactor;
a gas analyzer configured to determine a composition of fuel provided to the CPOx reactor from the fuel inlet;
an oxidation catalyst configured to reduce an $O_2$ content of fuel received from the CPOx reactor;
a reforming catalyst configured to at least partially reform fuel received from the oxidation catalyst;

a stack comprising fuel cells configured to generate electricity using fuel received from the reforming catalyst; and a controller configured to control at least one of a fuel flow rate through the system, current output by the stack, or a fuel exhaust recycle rate, based on at least the fuel composition determined by the gas analyzer, wherein the controller is configured to activate the blower during steady-state operation of the system, without igniting fuel in the CPOx reactor, when the gas analyzer detects an ethane content, a propane content, or a combined ethane and propane content, of the fuel exceeds a predetermined percentage.

14. The system of claim 13, wherein the predetermined percentage is about 9 vol %.

* * * * *